(12) United States Patent
Ruble et al.

(10) Patent No.: US 9,160,633 B1
(45) Date of Patent: Oct. 13, 2015

(54) SYSTEMS AND METHODS FOR DYNAMICALLY LEARNING VIRTUAL LOCAL AREA NETWORK (VLAN) TAGS

(75) Inventors: Andrew T. Ruble, Elkmont, AL (US); Troy Wayne White, Toney, AL (US)

(73) Assignee: ADTRAN, Inc., Huntsville, AL (US)

( * ) Notice: Subject to any disclaimer, the term of this patent is extended or adjusted under 35 U.S.C. 154(b) by 451 days.

(21) Appl. No.: 13/267,938

(22) Filed: Oct. 7, 2011

(51) Int. Cl.
| | |
|---|---|
| H04L 12/28 | (2006.01) |
| H04L 12/54 | (2013.01) |
| H04L 12/26 | (2006.01) |
| H04L 12/813 | (2013.01) |
| H04L 12/833 | (2013.01) |

(52) U.S. Cl.
CPC .............. *H04L 43/022* (2013.01); *H04L 47/20* (2013.01); *H04L 47/31* (2013.01)

(58) Field of Classification Search
CPC ........ H04L 43/022; H04L 47/20; H04L 47/31
USPC ............... 370/351, 389, 392, 395.31, 395.53, 370/395.54, 401
See application file for complete search history.

(56) References Cited

U.S. PATENT DOCUMENTS

| | | | | |
|---|---|---|---|---|
| 5,920,699 | A | * | 7/1999 | Bare .............................. 709/225 |
| 6,061,334 | A | | 5/2000 | Berlovitch et al. |
| 6,639,901 | B1 | | 10/2003 | Katzri et al. |
| 6,980,547 | B1 | * | 12/2005 | Gally et al. .................... 370/389 |
| 7,006,444 | B1 | | 2/2006 | Stone |
| 7,102,996 | B1 | * | 9/2006 | Amdahl et al. ................ 370/230 |
| 7,149,214 | B2 | * | 12/2006 | Wu et al. ........................ 370/389 |
| 7,339,929 | B2 | * | 3/2008 | Zelig et al. .................... 370/390 |
| 7,400,634 | B2 | | 7/2008 | Higashitaniguchi et al. |
| 7,680,086 | B2 | * | 3/2010 | Eglin ............................. 370/338 |
| 7,796,590 | B1 | * | 9/2010 | Melman et al. ............... 370/389 |
| 8,005,981 | B2 | * | 8/2011 | Tuck et al. ..................... 709/238 |
| 8,040,872 | B2 | * | 10/2011 | Saito et al. .................... 370/351 |
| 8,135,007 | B2 | * | 3/2012 | Kasralikar et al. ............ 370/389 |
| 8,208,463 | B2 | * | 6/2012 | Yadav et al. ................... 370/389 |
| 8,208,483 | B2 | * | 6/2012 | Thyni ............................ 370/417 |
| 8,462,779 | B2 | * | 6/2013 | Igarashi et al. ............... 370/389 |
| 8,467,311 | B2 | * | 6/2013 | Sharief ......................... 370/252 |
| 8,509,232 | B2 | * | 8/2013 | Bejerano et al. .............. 370/390 |
| 8,615,008 | B2 | * | 12/2013 | Natarajan et al. ............. 370/389 |
| 2005/0094634 | A1 | * | 5/2005 | Santhanakrishnan et al. ............................. 370/389 |
| 2008/0175254 | A1 | | 7/2008 | Ho |

* cited by examiner

*Primary Examiner* — Brian O'Connor
(74) *Attorney, Agent, or Firm* — Maynard Cooper & Gale, P.C.; Jon E. Holland

(57) ABSTRACT

A system for dynamically learning virtual local area network (VLAN) tags comprises a switching element having a VLAN table and a media access control (MAC) table. For at least one VLAN, the switching element is configured to dynamically learn VLAN tags for packets carried by the VLAN in order to build the VLAN table and to then use mappings of the VLAN table, rather than mappings of the MAC table, to make forwarding decisions for all types of packets carried by the VLAN. The MAC table is not used for forwarding decisions for packets carried by the VLAN, but it can be used to help learn the VLAN tags. In particular, the switching element can use the MAC table to selectively trap packets when they are useful for learning VLAN tags and to prevent MAC learning traps for packets carrying VLAN tags previously learned by the switching element.

12 Claims, 8 Drawing Sheets

| MAC Address | Port | VLAN Tag |
|---|---|---|
| MAC Address 1 | Port 1 | VLAN Tag 1 |
| MAC Address 2 | Port 2 | VLAN Tag 2 |
| MAC Address 2 | Port 2 | VLANTag 1 |
| MAC Address 3 | Port 1 | VLAN Tag 3 |

FIG. 6

SYSTEMS AND METHODS FOR DYNAMICALLY LEARNING VIRTUAL LOCAL AREA NETWORK (VLAN) TAGS

RELATED ART

Carrier Ethernet networks typically have a plurality of switching elements connected to one another to facilitate communication of data packets through the network. Many of the switching elements make forwarding decisions based on media access control (MAC) addresses and/or virtual local area network (VLAN) tags depending on various factors. In particular, a MAC table is typically used to make forwarding decisions for known unicast packets, while a VLAN table is typically used to make forwarding decisions for unknown unicast, multicast, and broadcast packets.

A switching element usually learns MAC addresses for the MAC table by dynamically monitoring the traffic received by the switching element, and the VLAN table is often provisioned by a service provider technician. Provisioning the VLAN table and allowing the MAC addresses to be dynamically learned provides a manageable solution to the service provider. However, such a solution limits the forwarding possibilities and leaves holes in the traffic management. For example, the MAC table has a finite amount of memory which limits the number of MAC addresses that can be stored in the MAC table at one time. Such limited memory can cause operational problems, inefficiencies, and troubleshooting issues.

BRIEF DESCRIPTION OF THE DRAWINGS

The present disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

FIG. 6 depicts an exemplary embodiment of a MAC table, such as is depicted by FIG. 3.

DETAILED DESCRIPTION

Embodiments of the present disclosure generally pertain to systems and methods for dynamically learning virtual local area network (VLAN) tags in network devices. A system in accordance with an exemplary embodiment of the present disclosure comprises a switching element having forwarding logic, a VLAN table, a media access control (MAC) table, and a processor. Mappings in the VLAN table are used to make forwarding decisions for unknown unicast, multicast, and broadcast packets. For at least one VLAN, the switching element is configured to dynamically learn VLAN tags for packets carried by the VLAN in order to build the VLAN table and to then use mappings of the VLAN table, rather than mappings of the MAC table, to make forwarding decisions for all types of packets carried by the VLAN.

In such embodiment, the MAC table is not used for forwarding decisions for packets carried by the VLAN, but the MAC table can be used to help learn the VLAN tags. In particular, when a port of the switching element receives a data packet having a source MAC address unknown to the MAC table, a MAC table miss causes the packet to be trapped such that the packet's metadata is sent to the processor. In handling the trap, table managing logic in the processor is configured to update the VLAN table to associate at least the packet's ingress port with the packet's VLAN tag. The table managing logic also disables MAC learning traps for the packet's VLAN tag on the ingress port. Accordingly, the switching element uses the MAC table to selectively trap packets when they are useful for learning VLAN tags and to prevent MAC learning traps for packets carrying VLAN tags previously learned by the switching element.

Note that such techniques for learning VLAN tags are compatible with conventional switching hardware architectures. In this regard, by downloading the table managing logic into a processor of a conventional switching element, the conventional switching element can be configured to dynamically learn VLAN tags for the VLAN table and to make forwarding decisions based on the VLAN table rather than the MAC table, as described herein.

Figure 1:
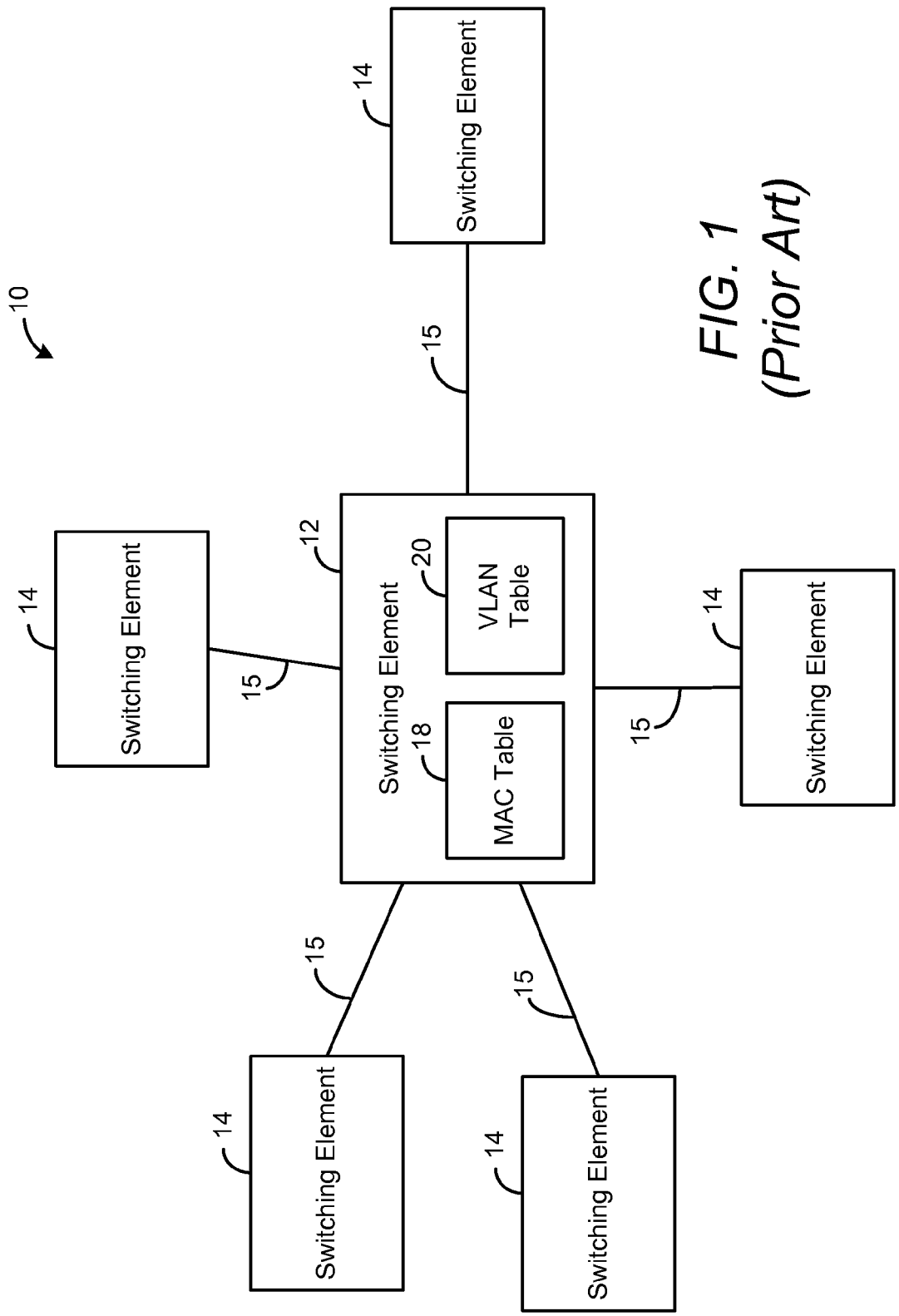
FIG. 1 is a block diagram depicting a conventional communication system.

FIG. 1 depicts a conventional communication system 10. The communication system 10 comprises a switching element 12 communicating with a plurality of switching elements 14 via respective network connections 15. The switching element 12 is configured to receive data packets from the other switching elements 14 and switch or route the data packets among the connections 15 based on header information in the packets, discussed in more detail hereafter. Typically, the switching element 12 forwards the packets based on MAC addresses and/or VLAN tags in the packet headers depending on various factors.

The switching elements 12 and 14 implement at least one VLAN. Note that there are generally three types of packets communicated by the conventional communication system 10 of FIG. 1: broadcast, multicast, and unicast. A broadcast packet is generally transmitted from a source to all destinations of a VLAN. A multicast packet is generally transmitted from a source to a group of destinations within a VLAN, and a unicast packet is transmitted from a source to a destination having an address that is specified in the unicast packet. The packet's type is typically indicated by a field (e.g., MAC destination address) in the packet's header.

In general, when the switching element 12 receives a broadcast or multicast packet carried by a VLAN, the switching element 12 forwards the packet based on the VLAN table 20. In particular, the switching element 12 forwards a broadcast or multicast packet to all of its ports (not shown in FIG. 1) that are members of the VLAN, as indicated by the VLAN table 20, except for the port that received the packet on ingress to the switching element 12.

For a unicast packet, the switching element 12 forwards the packet only to the port or ports mapped by the MAC table 18 to the packet's destination MAC address or other information in the packet's header. In this regard, the MAC table 18 of the switching element 12 has a plurality of entries in which each entry defines a mapping for associating at least a MAC address with a port identifier. In particular, each entry comprises a MAC address identifying a resource of the network to which data packets may be sent. The entry also comprises a port identifier that uniquely identifies a port of the switching element 12 thereby mapping such port to the MAC address in the same entry. The entry may also comprise a VLAN tag on which forwarding decisions can be made. Thus, if a particular resource communicates via four different VLANs, then the resource's MAC address may be included in at least four entries of the MAC table 18 in which each entry comprises a respective VLAN tag.

When the switching element 12 receives a unicast packet, the switching element 12 searches for an entry corresponding to the packet's destination MAC address and VLAN tag, if the packet has a VLAN tag. If the switching element 12 finds an entry having the packet's destination MAC address and VLAN tag, the switching element 12 forwards the packet to the port or ports in such entry. In this regard, the switching element 12 uses the destination MAC address and the VLAN tag of the packet as keys to lookup in the MAC table 18 the port identifier or identifiers correlated with (e.g., in the same entry as) the packet's destination MAC address and VLAN tag. When the switching element 12 finds a MAC table entry corresponding to the destination MAC address of the received unicast packet (i.e., when there is a MAC table hit), the unicast packet is referred to as a "known" unicast packet.

If the MAC table 18 does not have an entry corresponding to the destination MAC address of a received unicast packet (i.e., if there is a MAC table miss), then unicast packet is referred to as an "unknown" unicast packet. The switching element 12 is configured to forward an unknown unicast packet like a broadcast or multicast packet. That is, the switching element 12 forwards an unknown unicast packet carried by a VLAN to all of the ports (not shown in FIG. 1) that are members of the VLAN, as indicated by the VLAN table 20, except for the port that received the packet on ingress to the switching element 12. In this regard, known unicast packets are typically forwarded based on the MAC table 18, while broadcast, multicast, and unknown unicast packets are usually forwarded (e.g., flooded) based on the VLAN table 20.

The VLAN table 20 of the switching element 12 has a plurality of entries in which each entry defines a mapping for associating at least a VLAN tag with a port identifier. Each entry of the VLAN table 20 typically stores a VLAN tag, such as an S-tag or a C-tag, identifying a particular VLAN and at least one port identifier identifying a port that is a member of the VLAN. In the conventional switching element 12 shown by FIG. 1, the MAC table 18 is used to make forwarding decisions for known unicast packets, and the VLAN table 20 is used to make forwarding decisions for broadcast, multicast, and unknown unicast packets. A service provider technician typically provisions the VLAN table 20, and the switching element 12 monitors data traffic to dynamically learn the MAC table 18. However, due to limited amount of memory in the MAC table 18, the number of MAC addresses that can be stored at one time is limited, and the MAC table 18 is typically unable to map simultaneously all of the MAC addresses for the traffic that may pass through the switching element 12.

Figure 2:
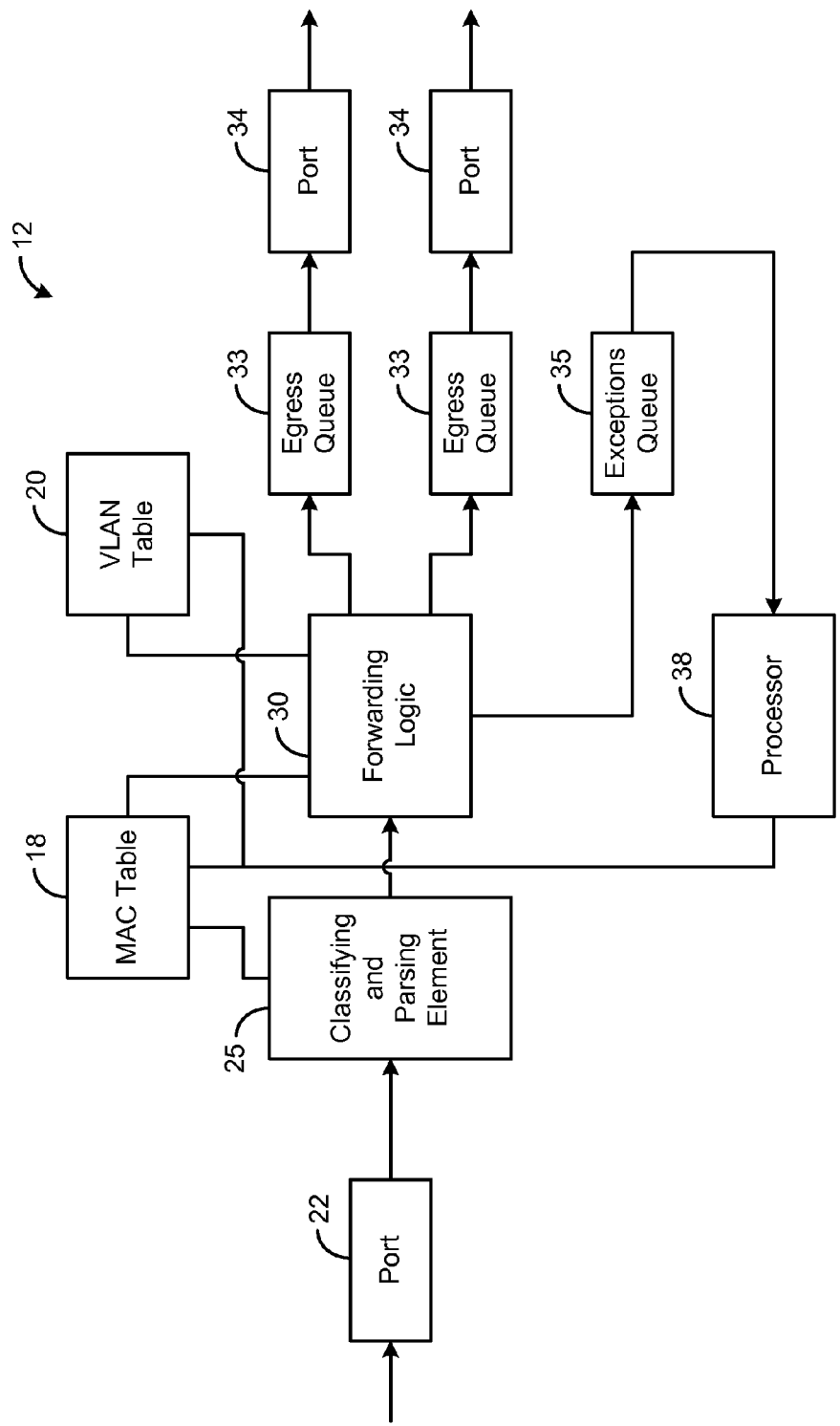
FIG. 2 is a block diagram depicting a conventional switching element depicted by FIG. 1.

FIG. 2 depicts a conventional switching element 12, such as is depicted by FIG. 1. Data traffic is received via one or more ports 22. Each received packet is parsed and classified by a classifying and parsing element 25 to determine metadata indicative of various attributes of the packet, such as MAC addresses, VLAN tags, message type, and a port identifier for the port 22 that received the packet on ingress to the switching element 12. For example, the element 25 may determine metadata indicating the destination and/or source MAC address of the packet and whether the packet is a unicast, multicast, or broadcast packet. For packets carried by VLANs, referred to hereafter as "VLAN packets," the metadata typically includes at least one VLAN tag for the packet.

Upon receiving a VLAN packet, the classifying and parsing searches the MAC table 18 for an entry corresponding to the packet using the packet's metadata. Specifically, for a VLAN packet, the forwarding logic 30 searches the MAC table 18 for an entry having a MAC address and VLAN tag respectively matching the destination MAC address and VLAN tag of the packet. If there is such a corresponding entry resulting in a MAC table hit, the packet is forwarded to one or more egress queues 33 to await transmission from output ports 34, as appropriate. In this regard, the packet is forwarded to each egress queue 33 that is coupled to and feeds a port 34 identified by the corresponding MAC table entry. Known unicast packets are forwarded by the forwarding logic 30 based on the MAC table 18.

If there is no corresponding entry in the MAC table 18 resulting in a MAC table miss for the packet's destination MAC address or if there is no destination MAC address in the packet, the forwarding logic 30 is configured to flood the packet to all ports that are members of the VLAN. In this regard, the forwarding logic 30 searches for the packet's VLAN tag in the VLAN table 20 to determine a list (one or more) of port identifiers identifying the ports 34 that are members of the packet's VLAN. The forwarding logic 30 then forwards the packet to each identified port 34 by transmitting the packet to each egress queue 33 that is coupled to and feeds any of the identified ports 34. Broadcast, multicast, and unknown unicast packets result in a MAC table miss such that they are flooded based on the VLAN table 20.

At least some packets are trapped by the forwarding logic 30 so that their metadata are transmitted to an exceptions queue 35 to await processing by a processor 38. Note that there are a variety of reasons why a packet may be trapped for processing by the processor 38. As an example, packets may be trapped in order to dynamically learn MAC addresses for the MAC table 18, referred to as "MAC learning."

In this regard, when a packet is received by the switching element 12, the classifying and parsing element 25 searches the MAC table 18 for an entry corresponding to the packet's source MAC address, VLAN tag, and ingress port 22. That is, the element 25 searches the MAC table 18 for an entry having a MAC address, VLAN tag, and port identifier respectively matching the source MAC address in the packet's header, the VLAN tag in the packet's header, and the port identifier identifying the port 22 that received the packet on ingress to the switching element 12. If there is no such corresponding entry (e.g., the source MAC address is not found in the MAC table 18) resulting in a MAC table miss, the element 25 marks the packet for exception so that the forwarding logic 30 traps the packet by forwarding at least the packet's metadata to the processor 38. Such a trap that occurs due to a MAC table miss related to the packet's source MAC address, VLAN tag, and ingress port identifier is referred to herein as a "MAC learning trap." Upon receiving the metadata of the trapped packet from the exceptions queue 35, the processor 38 updates the MAC table 18 based on such metadata to add an entry for the packet's source MAC address. In particular, the processor 38 adds an entry to the MAC table 18, and the entry correlates the packet's source MAC address and VLAN tag with the port identifier identifying the port 22 that received the packet on ingress to the switching element 12.

The architecture of many conventional switching elements allows MAC learning traps and, hence, MAC learning to be selectively disabled on a per-port or per-VLAN basis. This is sometimes achieved by marking bits of the MAC addresses in the MAC table 18 as "don't cares" or "DC" such that there is a guaranteed match at any bit position marked as a "DC." For example, if an entry of the MAC table 18 is defined such that it has a port identifier, a VLAN tag, and a MAC address with each bit of the MAC address marked as a "DC," then a MAC table hit will result for the source MAC address of any packet that is carried by the identified VLAN and received by the identified port. Note that the bits of the other parameters in the MAC table 18 may be similarly marked as "DC." For example, defining an entry of the MAC table 18 such that all of the bits of the entry's MAC address and port identifier are marked as "DC" effectively disables MAC learning traps for all packets carried by the identified VLAN.

Figure 3:
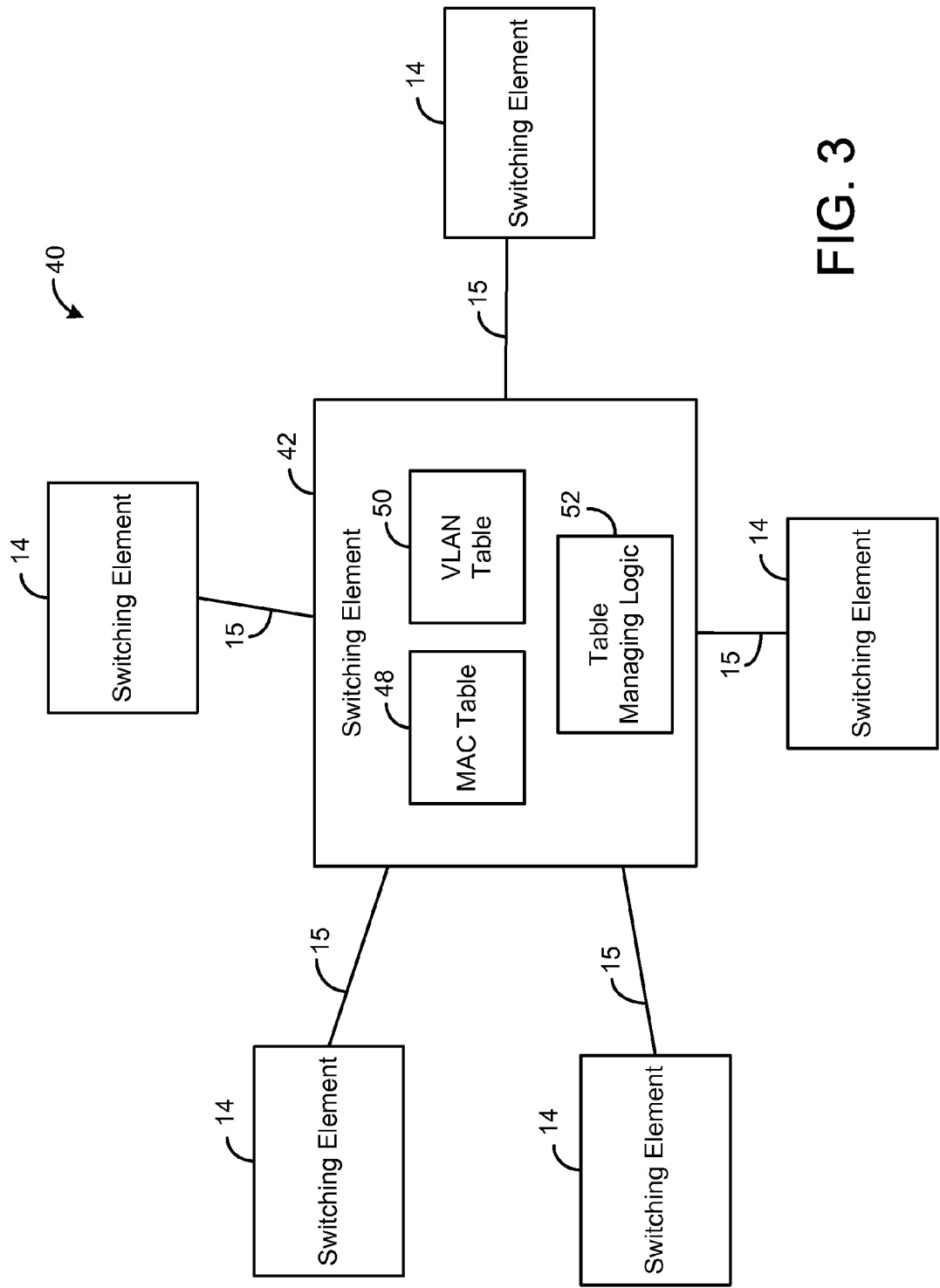
FIG. 3 is a block diagram depicting an exemplary embodiment of a communication system.

FIG. 3 depicts an exemplary embodiment of a communication system 40. The communication system 40 comprises an exemplary switching element 42 communicating with a plurality of switching elements 14 via respective network connections 15, similar to the conventional switching element 12 set forth above with respect to FIG. 1. In one embodiment, the switching element 42 communicates with the switching elements 14 using Ethernet protocols, although other types of transport protocols are possible in other embodiments.

The switching element 42 is configured to receive packets, such as, for example, unicast, broadcast, and multicast packets, and forward the packets based on a MAC table 48 and a VLAN table 50. Specifically, except as is otherwise described below, the exemplary switching element 42 is configured to forward known unicast packets based upon a MAC table 48 and to forward broadcast, multicast, and unknown unicast packets based upon a VLAN table 50, as described above for the conventional switching element 12 depicted by FIG. 2. Furthermore, for at least one VLAN, the exemplary switching element 42 uses the MAC table 48 to dynamically learn the VLAN tags for the VLAN table 50 and then forwards VLAN packets based on the learned mappings of the VLAN table 50.

Note that the term "learned," when referring to a VLAN tag or a MAC address, is relative to a port of the switching element 42. In this regard, a VLAN tag is deemed to be "learned" for a given port when it is discovered that the port is a member of the VLAN identified by the VLAN tag. When a VLAN tag is learned, the VLAN table 50 is updated such that it associates the VLAN tag with the port that was determined to be a member of the VLAN identified by the VLAN tag. Such learning may occur when the port receives a packet carrying the VLAN tag. Similarly, a MAC address is deemed to be "learned" for a given port when it is discovered that unicast messages destined for the resource identified by the MAC address are to be forwarded to such port. Such learning may occur when the port receives a packet having the MAC address as its source address.

For illustrative purposes, it will be assumed that the switching element 42 dynamically learns the VLAN tags and disables MAC learning for all VLANs serviced by the switching element 42 according to the techniques described herein. However, dynamic learning of VLAN tags and disablement of MAC learning for all VLANs are unnecessary, and other configurations of the switching element 42 are possible in other embodiments.

As set forth above with respect to FIG. 1, the MAC table 48 typically stores a plurality of entries, with each entry comprising information such as the MAC address identifying a resource of the network 40 to which data packets may be sent, a VLAN tag, and a port identifier that uniquely identifies a port of the switching element 42 thereby mapping such port to the MAC address in the same entry. Note that, unlike mappings in the MAC table 18 in the conventional switching element 12 of FIG. 1, mappings in the MAC table 48 are not used to make forwarding decisions for VLAN packets for at least one VLAN. Instead, mappings in the VLAN table 50 are used to make forwarding decisions for all types of packets carried by the VLAN.

Unlike the conventional switching element 12 set forth above with respect to FIG. 1, the exemplary switching element 42 of FIG. 3 further comprises table managing logic 52 configured to manage VLAN tag learning for the VLAN table 50, discussed in more detail hereafter. Thus, the switching element 42 monitors data traffic in order to build the VLAN table 50 using VLAN tags dynamically learned by the switching element 42. Further, the switching element 42 uses the MAC table 48 to learn the VLAN tags. In this regard, when a MAC learning trap occurs, the metadata of the trapped packet is sent to the processor 58, as described above for the conventional switch 12. Table managing logic 52 within the processor 58 uses such metadata to modify the VLAN table 50 to associate the VLAN tag and the port identifier of the port (not shown in FIG. 3) that received the packet on ingress to the switching element 42. Via similar techniques, the port identifiers of other ports that are members of such VLAN will be added to the entry or otherwise associated with the foregoing VLAN tag in the VLAN table 50 so that the VLAN tag is eventually associated with each port that is a member of the VLAN identified by such tag. Accordingly, the need to manually provision the VLAN table 50 by the service provider is eliminated.

Figure 4:
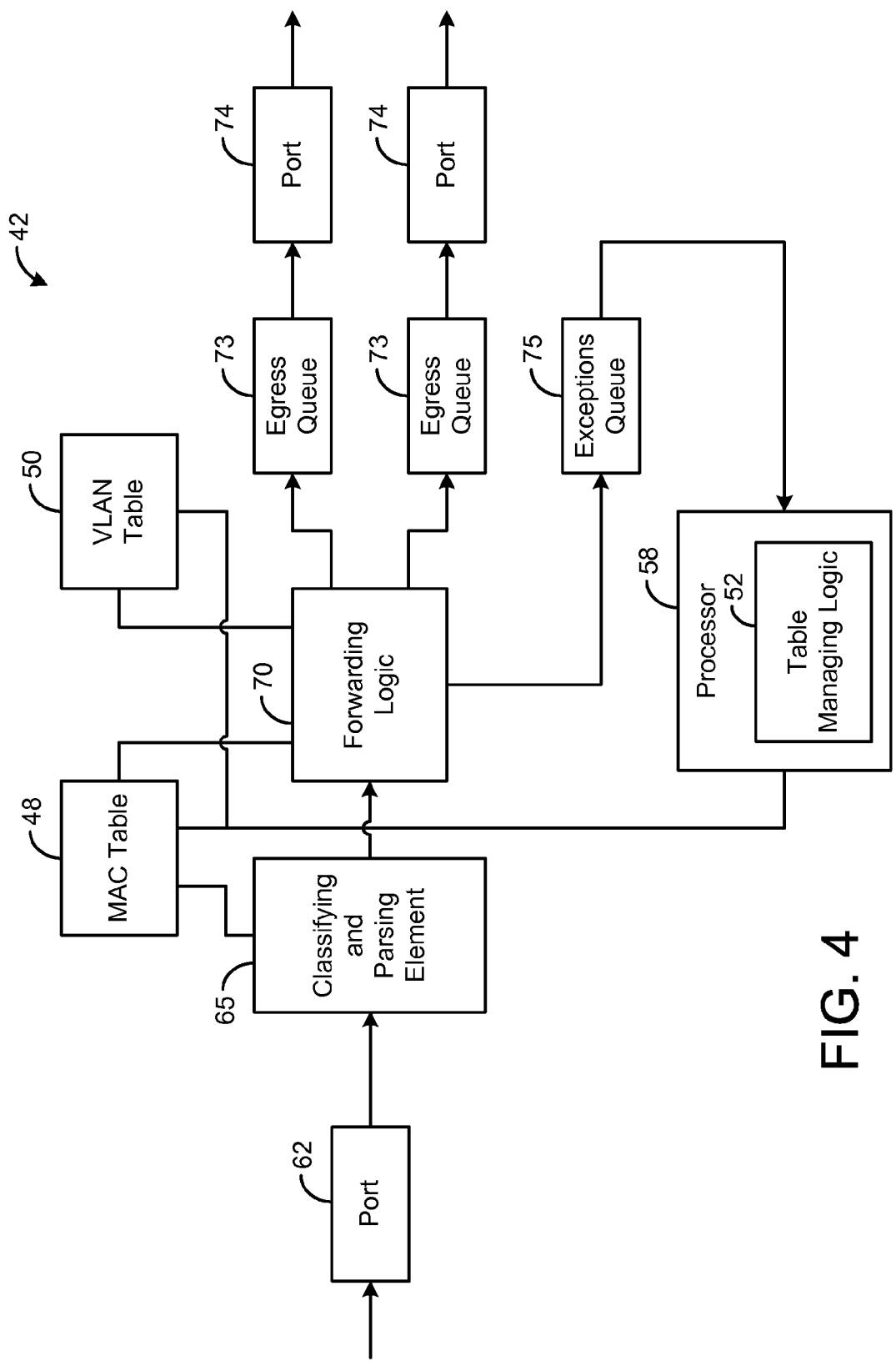
FIG. 4 is a block diagram depicting an exemplary embodiment of a switching element, such as is depicted by FIG. 3.

FIG. 4 depicts an exemplary embodiment of the switching element 42. Data traffic is received via at least one port 62. Note that, for simplicity, FIG. 4 shows traffic flowing from the port 62 to the ports 74. However, traffic may be received by any of the ports 62 and 74 and flow to any of the ports 62 and 74.

In one embodiment, the data traffic comprises one or more VLAN packets carried by one or more VLANs. Each packet typically has header information and payload information. The switching element 42 comprises a classifying and parsing element 65 configured to determine the metadata indicative of various attributes of the packet, such as MAC addresses, VLAN tags, message type, and port identifier for the port 62 that received the packet on ingress to the switching element 42. For VLAN packets, the metadata includes at least a source MAC address, a VLAN tag for the packet, and a port identifier identifying the port 62 that received the packet on ingress to the switching element 42. For VLAN unicast packets, the metadata also includes a destination MAC address. For simplicity of illustration, it will be assumed hereafter that each VLAN packet includes a single VLAN tag unless otherwise indicated, but it should be emphasized that it is possible for any VLAN packet to include multiple VLAN tags.

Upon receiving a VLAN packet, the classifying and parsing element 65 searches the MAC table 48 for an entry corresponding to the packet using the packet's metadata. Specifically, for a VLAN packet, the element 65 searches the MAC table 48 for an entry having a MAC address, VLAN tag, and port identifier respectively matching the source MAC address of the packet, the VLAN tag of the packet, and port identifier identifying the port 62 that received the packet on ingress. If there is a corresponding entry in the MAC table 48 resulting in a MAC table hit, the element 65 does not mark the packet for exception, and a MAC learning trap does not occur. The forwarding logic 70 forwards the packet to one or more egress queues 73 to await transmission from ports 74 of the switching element 42. Such forwarding is based on mappings in the VLAN table 50, as will be described in more detail hereafter.

If there is no corresponding entry in the MAC table 48 resulting in a MAC table miss, the packet is trapped, assuming that MAC learning traps are enabled. In this regard, the element 65 marks the packet for exception such that the forwarding logic 70 traps the packet by forwarding at least the packet's metadata to an exceptions queue 75 to await processing by a processor 58. The processor 58 comprises table managing logic 52 configured to manage the VLAN table 50 and the MAC table 48. Note that the table managing logic 52 may be implemented in hardware, software, firmware, or any combination thereof. In the embodiment depicted by FIG. 4, the logic 52 is implemented in software and stored in memory (not shown in FIG. 4) of the processor 58.

In one embodiment, the table managing logic 52 manages the VLAN tag learning for the VLAN table 50 based on the metadata of trapped packets. In this regard, when a MAC learning trap occurs, the logic 52 updates the VLAN table 50 as appropriate to associate at least the packet's ingress port 62 with the packet's VLAN tag. The logic 52 then disables MAC learning traps for packets having the same source address, VLAN tag, and ingress port. Thus, when the identified port 62 later receives a packet having the same source MAC address and VLAN tag, such packet should not be trapped unless there is another exception unrelated to MAC learning.

Note that there are a variety of techniques that may be used to disable MAC learning traps, as described above. For example, typical off-the-shelf switching elements have a function that permits disabling of MAC learning traps on a per-port and/or per-VLAN basis. Such function can be exploited to prevent further trapping of packets that are received by a particular port and have a previously learned VLAN tag for such port. For example, in one embodiment, when a VLAN tag is learned for a given port, the MAC table 48 is updated in order to disable MAC learning traps for the same VLAN on the same port. An entry of the MAC table 48 is updated to associate the port identifier for such port and the previously learned VLAN tag, and each bit of the MAC address for this entry is marked as a "DC." Thus, every packet having such learned VLAN tag and received by the foregoing port results in a MAC table hit regardless of the packet's source MAC address, and the classifying and parsing element 65 will not cause a MAC learning trap for such a packet. Accordingly, the MAC table 48 is used to trap packets carrying VLAN tags that have yet to be learned for the VLAN table 50 while preventing MAC learning traps for packets carrying VLAN tags that have been previously learned.

Note that the VLAN tag learning described above can be achieved without having to modify the hardware of existing off-the-shelf switching elements. Particularly, a conventional switching element, such as, for example, the conventional switching element 12 of FIG. 2, can be configured to operate as described with respect to FIGS. 3 and 4 by downloading the table managing logic 52 to the processor 58. Thus, implementation of the exemplary switching element 42 can exploit existing switch architectures to help reduce implementation costs and burdens.

Figure 5:
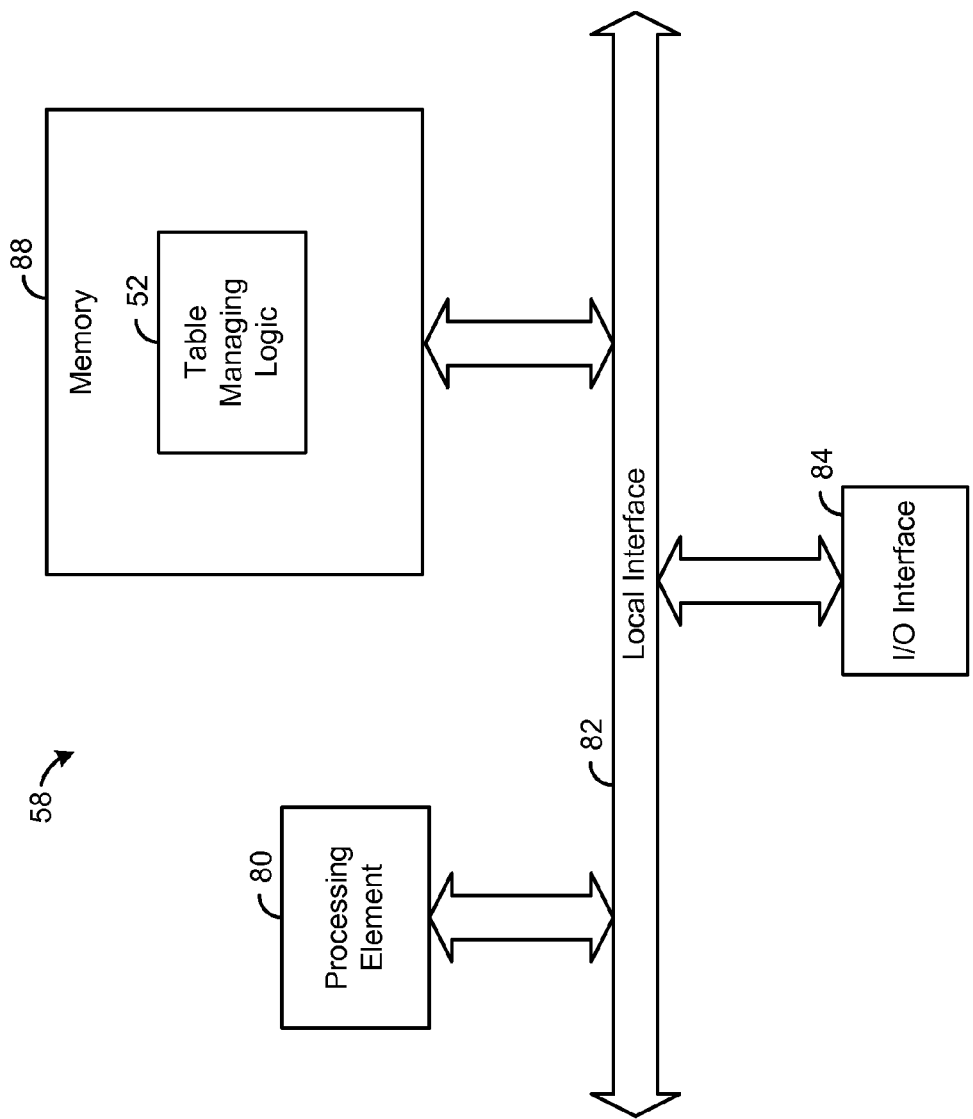
FIG. 5 depicts an exemplary embodiment of a processor, such as is depicted by FIG. 4.

FIG. 5 depicts an exemplary embodiment of the processor 58 of FIG. 4. The processor 58 comprises at least one conventional processing element 80, such as a central processing unit (CPU), that communicates to and drives the other elements within the processor 58 via a local interface 82. Furthermore, an I/O interface 84 can be used to input and output data to and from the processor 58. For example, in one embodiment, the I/O interface 84 comprises a plurality of pins for communicating with the exceptions queue 75, the MAC table 48, and the VLAN table 50.

The processor 58 further comprises table managing logic 52. As set forth above, the table managing logic 52 is configured to manage entries in the MAC table 48 and the VLAN table 50. It should be noted that the table managing logic 52 can be implemented in hardware, software, firmware, or any combination thereof. In the exemplary embodiment illustrated in FIG. 5, the logic 52 is implemented in software and stored in memory 88 of the processor 58.

Note that the table managing logic 52, when implemented in software, can be stored and transported on any computer-readable medium for use by or in connection with an instruction execution apparatus that can fetch and execute instructions. In the context of this document, a "computer-readable medium" can be any means that can contain or store a computer program for use by or in connection with an instruction execution apparatus.

FIG. 6 depicts an exemplary embodiment of the MAC table 48 of FIG. 3. The MAC table 48 has a plurality of entries respectively corresponding to MAC addresses. In one embodiment, each entry of the MAC table 48 defines a mapping for associating at least a MAC address with a port identifier. In particular, each entry comprises a MAC address identifying a resource of the network 40 to which data packets may be sent. The entry also comprises a port identifier that uniquely identifies a port of the switching element 42 thereby mapping such port to the MAC address in the same entry. The entry may also comprise a VLAN tag on which forwarding decisions can be made.

Note that the MAC addresses in the MAC table 48 are dynamically learned by monitoring data traffic through the switching element 42, according to the techniques described above with respect to the MAC table 18 of FIG. 2. Further, similar to the conventional table 18, MAC learning traps can be disabled on a per-port and/or per-VLAN basis. Indeed, in one exemplary embodiment, the hardware architecture of the switching element 42 is identical to that of the conventional switching element 12, although other types of hardware architectures may be used, if desired.

Figure 7:
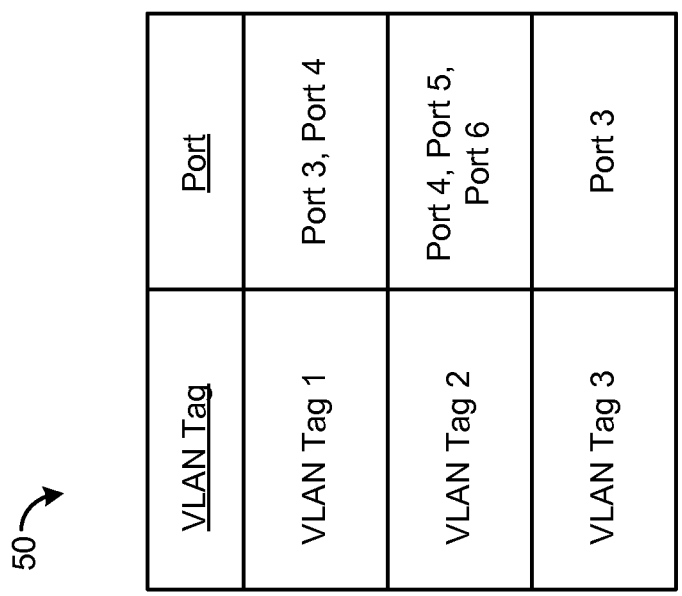
FIG. 7 depicts an exemplary embodiment of a VLAN table, such as is depicted by FIG. 3.

FIG. 7 depicts an exemplary embodiment of the VLAN table 50 of FIG. 3. In the exemplary embodiment shown by FIG. 7, each entry of the VLAN table 50 stores a VLAN tag, such as an S-tag or a C-tag, identifying a particular VLAN, and at least one port identifier identifying a port 62 or 74 that is a member of the VLAN identified by the VLAN tag in the same entry. The table managing logic 52 is configured to build the VLAN table 50 based upon VLAN tags dynamically learned by such logic 52.

In this regard, when a MAC learning trap occurs as described above, the metadata of the trapped packet is sent to the processor 58 (FIG. 4) for processing by the table managing logic 52. The logic 52 updates the VLAN table 50 to associate the VLAN tag included in the metadata with the port identifier also included in the metadata, which identifies the packet's ingress port. If there is no entry corresponding to the VLAN tag, the logic 52 creates a new entry for the mapping. If an entry already includes the VLAN tag, the logic 52 adds the port identifier to the entry, assuming that the port identifier is not already included in such entry. In an alternative embodiment, each entry may have a single port identifier, and a new entry for the same VLAN tag may be created for each new port identifier to be associated with such VLAN tag. In any event, the VLAN table 50 is appropriately updated to indicate that the port identified by the metadata (i.e., the port that received the trapped packet) is a member of the VLAN tag included in the metadata. Accordingly, the VLAN tag is learned for the identified port, and thereafter a packet carried by the identified VLAN may be forwarded to the foregoing port based on the newly created or updated mapping.

Over time, packets carried by the same VLAN are received by other ports, and the VLAN table 50 is similarly updated. Therefore, eventually, the VLAN table 50 is completely built for the identified VLAN such that the VLAN table 50 associates the VLAN tag with all ports that are members of the identified VLAN. By dynamically building the VLAN table 50, it is unnecessary for a service technician to manually provision the VLAN table 50.

Note that switching elements at the edge of a network often mark the beginning of a VLAN. That is, such switching elements determine which VLAN is to carry a received packet and then insert the appropriate VLAN information, such as VLAN tags, into the packet so that the packet may be appropriately forwarded by other switching elements through the VLAN. Manual provisioning of the edge switching elements may be desirable in order to enable such elements to appropriately define the VLAN header information for VLAN packets, but the intermediate switching elements between the edge switching elements may be configured to dynamically learn VLAN tags, as described above.

Further, by preventing or not performing MAC learning for packets carried by a VLAN as described above, the forwarding logic 70 is prevented from making forwarding decisions for the VLAN based on mappings in the MAC table 48. Specifically, when the forwarding logic 70 receives a unicast packet carried by the VLAN, the forwarding logic 70 is unable to match the destination MAC address of the packet with an entry of the MAC table 48 resulting in a MAC table miss. Accordingly, the unicast packet is treated as an unknown unicast packet and is forwarded based on the VLAN table 50. As an example, a unicast VLAN packet may be flooded, based on the VLAN table 50, to all ports that are members of the VLAN identified by the packet's VLAN tag. Since MAC learning for packets carried by the VLAN is not performed, memory space in the MAC table 48 is conserved for other uses, such as for mappings related to non-VLAN packets, and the drawbacks of having to use the MAC table 48 for making forwarding decisions for at least VLAN packets are avoided.

Note that all hardware switch architectures do not necessarily allow disabling of MAC learning traps on a per-port and per-VLAN basis. For example, some architectures may allow MAC learning traps to be disabled only on a per-port basis or only on a per-VLAN basis. In such cases, the logic 52 may be configured to make decisions about when to disable MAC learning traps within the context of the hardware architecture employed and the application in which the switching element 42 is to be used. If desired, the logic 52 may be configured to refrain from disabling MAC learning traps as is described above. In such case, MAC learning traps for VLAN packets occur, but the logic 52 refrains from updating the MAC table 48 based on the trapped packets. Thus, once the VLAN table 50 is built, the VLAN packets are still trapped, but the logic 52 ignores the metadata from MAC learning traps. Such an embodiment is generally less efficient than the embodiments described above for which MAC learning traps are disabled after the VLAN tags are learned, but it is implementable in a hardware architecture that does not allow MAC learning to be disabled on a per-port and/or per-VLAN basis.

An exemplary use and operation of the switching element 42 will now be described below with reference to FIG. 8.

For illustrative purposes, assume that a port 62, referred to hereafter as the "ingress port," receives a VLAN packet, referred to hereafter as the "newly received packet," having a VLAN tag that has yet to be learned by the switching element 42. In this regard, since installation of the switching element 42, the ingress port 62 has yet to receive a data packet carrying the VLAN tag in the packet now received via the ingress port 62. Once the packet is received, the classifying and parsing element 65 determines whether to a MAC learning trap should occur for the newly received packet, as shown by blocks 110 and 112 of FIG. 8. In particular, the element 65 searches the MAC table 48 for an entry corresponding to the source MAC address of the newly received packet, the VLAN tag of the newly received packet, and the port identifier of the ingress port 62. Since the VLAN tag has not been received by the ingress port 62 previously, a MAC table miss should occur causing a MAC learning trap.

In this regard, the element 65 marks the packet for exception and transmits the packet to the forwarding logic 70. The forwarding logic 70 forwards at least the packet's metadata to the exceptions queue 75 so that the metadata is eventually received by the processor 58. In response to such metadata, the table managing logic 52 updates the VLAN table 50 and disables MAC learning traps for the VLAN tag on the ingress port 62, as shown by blocks 115 and 118 of FIG. 8. Specifically, the logic 52 associates the port identifier of the ingress port 62 with the VLAN tag in the VLAN table 50 so that packets carried by the VLAN are mapped to such port identifier. The logic 52 also updates the MAC table 48 such that, if a packet carrying the same VLAN tag is later received by the ingress port 62, a MAC learning trap does not occur. As an example, the logic 52 may update the MAC table 48 to include an entry corresponding to the source MAC address of the newly received packet, the VLAN tag of the newly received packet, and the ingress port 62. Accordingly, if a packet carrying the same VLAN tag and source MAC address is indeed received by the ingress port 62, such packet would not be trapped unless there was an exception unrelated to MAC learning.

In block 121, the forwarding logic 70 determines whether there is a MAC table hit for the destination MAC address of the newly received packet. Specifically, the forwarding logic 70 searches the MAC table 48 for an entry corresponding to the destination MAC address and VLAN tag of the newly received packet. If there is a MAC table hit in block 121, then the forwarding logic 70 forwards the packet based on the corresponding entry in the MAC table 48, as shown by block 125. However, in the instant case, MAC learning does not occur for the packets carried by the VLAN identified by the newly received packet, and a "no" determination is therefore made in block 121 of FIG. 8.

Figure 8:
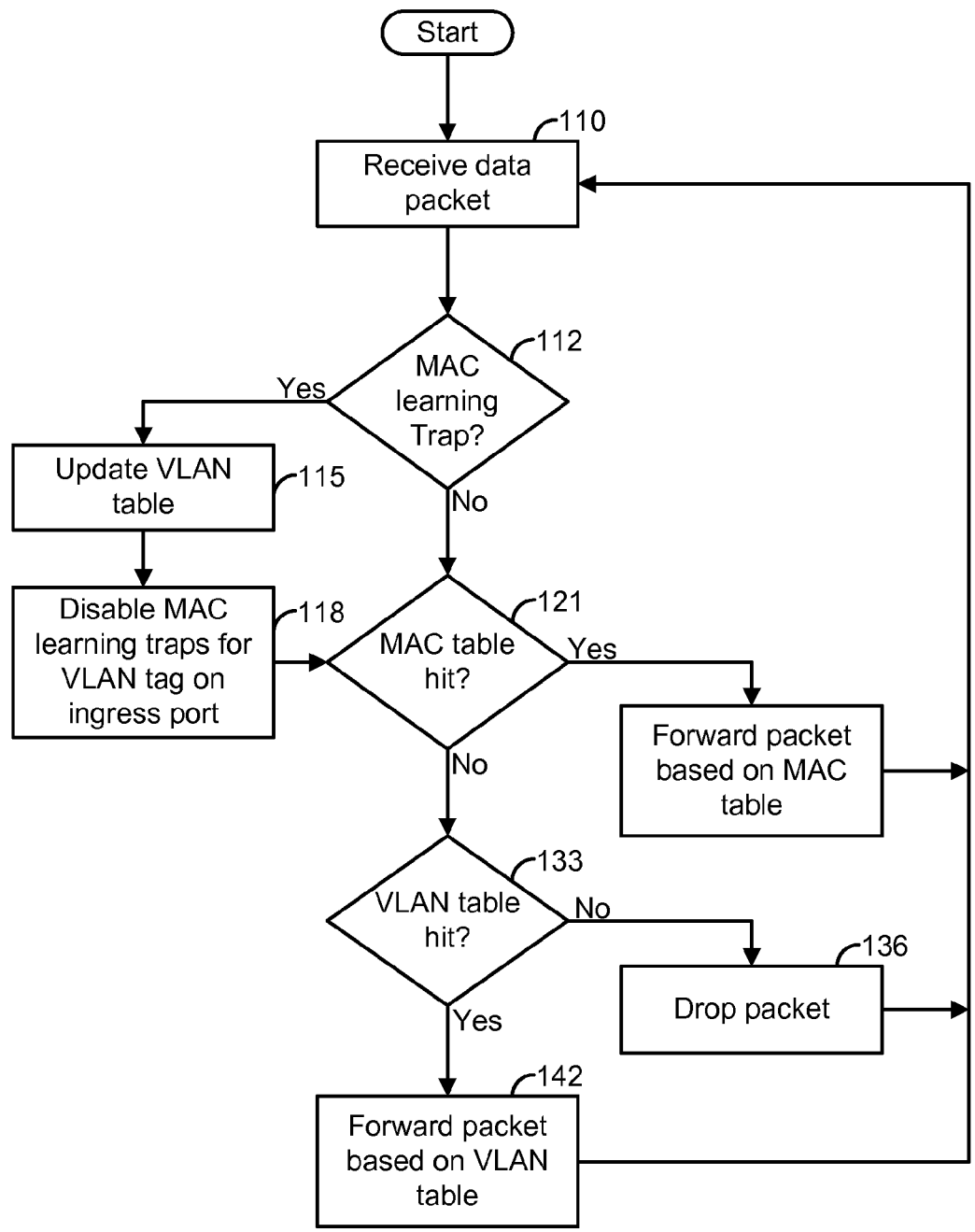
FIG. 8 is a flowchart illustrating an exemplary method of processing data packets in a switching element, such as is depicted by FIG. 4.

Accordingly, the forwarding logic 70 determines whether there is a VLAN table hit in block 133 of FIG. 8. Specifically, the forwarding logic 70 searches the VLAN table 50 for an entry corresponding to the VLAN identifier of the newly received packet. If such an entry cannot be found (i.e., there is a VLAN table miss), the forwarding logic 70 drops the packet, as shown by block 136. If there is VLAN table hit, then the forwarding logic 70 forwards the newly received packet to each port 74 that is associated with the VLAN tag by the VLAN table 50, as shown by block 142 of FIG. 8.

Note that the blocks of the flowchart of FIG. 8 do not necessarily occur in the sequence shown. As an example, it is possible for the forwarding logic 70 to check the MAC table 48 and/or VLAN table in blocks 121 and/or 133 and to forward the newly received packet before the VLAN table 50 is actually updated and MAC learning traps are disabled in blocks 115 and 118.

Now, therefore, the following is claimed:

1. A switching element, comprising:

a plurality of ports, including at least a first port and a second port;

memory for storing a media access control (MAC) table and a virtual local area network (VLAN) table, the MAC table mapping MAC addresses to port identifiers identifying the ports and the VLAN table mapping VLAN tags to port identifiers identifying the ports;

forwarding logic configured to receive a plurality of data packets from the ports, wherein for at least one of the data packets the forwarding logic is configured to search the MAC table for a mapping corresponding to a destination MAC address of the one data packet and to forward the one data packet to at least the second port based on the VLAN table in response to a MAC table miss for the destination MAC address, wherein the forwarding logic is configured to trap one of the data packets received from the first port such that metadata of the trapped data packet is transmitted to an exceptions queue in response to a MAC table miss for a source MAC address of the trapped data packet; and table managing logic configured to dynamically learn a plurality of VLAN tags based on the plurality of data packets and to build the VLAN table based on the learned VLAN tags, wherein the table managing logic for each of the learned VLAN tags is configured to update, in response to one of the data packets carrying the learned VLAN tag, the VLAN table to associate the learned VLAN tag with a port identifier identifying one of the ports that received the one data packet carrying the learned VLAN tag, wherein the table managing logic is configured to update the VLAN table based on the metadata such that the VLAN table associates a VLAN tag of the trapped data packet with a port identifier identifying the first port, and wherein the table managing logic is configured to disable, in response to the metadata, the switching element from updating the MAC table to learn the VLAN tag of the trapped data packet from data packets received by the first port.

2. The switching element of claim 1, further comprising a processor, wherein the table managing logic is stored in the processor.

3. The switching element of claim 1, further comprising a processor, wherein the table managing logic is stored in the processor, and wherein the processor is configured to pull the trapped data packet from the exceptions queue.

4. A switching element, comprising:

a plurality of ports, including at least a first port and a second port;

memory for storing a media access control (MAC) table and a virtual local area network (VLAN) table, the MAC table mapping MAC addresses to port identifiers identifying the ports and the VLAN table mapping VLAN tags to port identifiers identifying the ports;

forwarding logic configured to receive a plurality of data packets from the ports, wherein for at least one of the data packets the forwarding logic is configured to search the MAC table for a mapping corresponding to a destination MAC address of the one data packet and to forward the one data packet to at least the second port based on the VLAN table in response to a MAC table miss for the destination MAC address, and wherein the forwarding logic is configured to trap one of the data packets received from the first port such that metadata of the trapped data packet is transmitted to an exceptions queue in response to a MAC table miss for a source MAC address of the trapped data packet; and table managing logic configured to dynamically learn a plurality of VLAN tags based on the plurality of data packets and to build the VLAN table based on the learned VLAN tags, wherein the table managing logic for each of the learned VLAN tags is configured to update, in response to one of the data packets carrying the learned VLAN tag, the VLAN table to associate the learned VLAN tag with a port identifier identifying one of the ports that received the one data packet carrying the learned VLAN tag, wherein the table managing logic is configured to update the VLAN table based on the metadata such that the VLAN table associates a VLAN tag of the trapped data packet with a port identifier identifying the first port, and wherein the table managing logic is configured to disable MAC learning traps for the VLAN tag of the trapped data packet on the first port in response to the metadata.

5. A switching element, comprising:

a plurality of ports, including at least a first port and a second port;

memory for storing a media access control (MAC) table and a virtual local area network (VLAN) table, the MAC table mapping MAC addresses to port identifiers identifying the ports and the VLAN table mapping VLAN tags to port identifiers identifying the ports;

forwarding logic configured to receive a plurality of data packets from the ports, including at least a first data packet and a second data packet received from the first port, wherein the forwarding logic is configured to search the MAC table for a mapping corresponding to a destination MAC address of the first data packet and to forward the first data packet to at least the second port based on the VLAN table in response to a MAC table miss for the destination MAC address, the forwarding logic further configured to trap the second data packet such that metadata of the second data packet is transmitted to an exceptions queue in response to a MAC table miss for a source MAC address of the second data packet; and table managing logic configured to dynamically update the VLAN table based on the metadata such that the VLAN table associates a VLAN tag of the second data packet with a port identifier identifying the first port from which the second data packet is received by the forwarding logic, wherein the table managing logic is configured to disable, in response to the metadata, the switching element from updating the MAC table to learn the VLAN tag of the trapped data packet from data packets received by the first port.

6. The switching element of claim 5, further comprising a processor, wherein the table managing logic is stored in the processor.

7. A switching element, comprising:

a plurality of ports, including at least a first port and a second port;

memory for storing a media access control (MAC) table and a virtual local area network (VLAN) table, the MAC table mapping MAC addresses to port identifiers identifying the ports and the VLAN table mapping VLAN tags to port identifiers identifying the ports;

forwarding logic configured to receive a plurality of data packets from the ports, including at least a first data packet and a second data packet received from the first port, wherein the forwarding logic is configured to search the MAC table for a mapping corresponding to a destination MAC address of the first data packet and to forward the first data packet to at least the second port based on the VLAN table in response to a MAC table miss for the destination MAC address, the forwarding logic further configured to trap the second data packet such that metadata of the second data packet is transmitted to an exceptions queue in response to a MAC table miss for a source MAC address of the second data packet; and table managing logic configured to dynamically update the VLAN table based on the metadata such that the VLAN table associates a VLAN tag of the second data packet with a port identifier identifying the first port from which the second data packet is received by the forwarding logic, wherein the table managing logic is configured to disable, in response to the metadata, MAC learning traps for the VLAN tag of the second data packet on the first port.

8. A method for use in a switching element of a network, comprising:

storing, in memory, a media access control (MAC) table and a virtual local area network (VLAN) table, the MAC table mapping MAC addresses to port identifiers identifying ports of the switching element and the VLAN table mapping tags to port identifiers identifying the ports, wherein the ports include at least a first port and a second port;

receiving a plurality of data packets via the ports, wherein the receiving comprises receiving a first data packet and a second data packet via the first port;

searching the MAC table for a mapping corresponding to a destination MAC address of the first data packet;

forwarding the first data packet to at least the second port based on the VLAN table in response to a MAC table miss for the searching;

trapping the second data packet based on a source MAC address of the second data packet;

dynamically updating the VLAN table in response to the trapping based on metadata from the second data packet such that the VLAN table associates a VLAN tag of the second data packet with a port identifier identifying the first port; and disabling, in response to the trapping, the switching element from updating the MAC table to learn the VLAN tag of the trapped data packet from data packets received by the first port.

9. The method of claim 8, wherein the trapping comprises transmitting the metadata to a processor of the switching element.

10. A method for use in a switching element of a network, comprising:

storing, in memory, a media access control (MAC) table and a virtual local area network (VLAN) table, the MAC table mapping MAC addresses to port identifiers identifying ports of the switching element and the VLAN table mapping tags to port identifiers identifying the ports, wherein the ports include at least a first port and a second port;

receiving a plurality of data packets via the ports, wherein the receiving comprises receiving a first data packet and a second data packet via the first port;

searching the MAC table for a mapping corresponding to a destination MAC address of the first data packet;

forwarding the first data packet to at least the second port based on the VLAN table in response to a MAC table miss for the searching;

trapping the second data packet based on a source MAC address of the second data packet;

dynamically updating the VLAN table in response to the trapping based on metadata from the second data packet such that the VLAN table associates a VLAN tag of the second data packet with a port identifier identifying the first port; and disabling, in response to the trapping, MAC learning traps for the VLAN tag of the second data packet on the first port.

11. A switching element, comprising:

a plurality of ports, including at least a first port and a second port;

memory for storing a media access control (MAC) table and a virtual local area network (VLAN) table, the MAC table mapping MAC addresses to port identifiers identifying the ports and the VLAN table mapping VLAN tags to port identifiers identifying the ports;

a processor;

forwarding logic configured to receive a plurality of data packets from the ports, wherein for at least one of the data packets the forwarding logic is configured to search the MAC table for a mapping corresponding to a destination MAC address of the one data packet and to forward the one data packet to at least the second port based on the VLAN table in response to a MAC table miss for the destination MAC address, and wherein the forwarding logic is configured to trap one of the data packets received from the first port in response to a MAC table miss for a source MAC address of the trapped data packet such that metadata of the trapped data packet is transmitted to the processor; and table managing logic stored in the processor and configured to dynamically learn a plurality of VLAN tags based on the plurality of data packets and to build the VLAN table based on the learned VLAN tags, wherein the table managing logic for each of the learned VLAN tags is configured to update, in response to one of the data packets carrying the learned VLAN tag, the VLAN table to associate the learned VLAN tag with a port identifier identifying one of the ports that received the one data packet carrying the learned VLAN tag, wherein the table managing logic is configured to update the VLAN table based on the metadata such that the VLAN table associates a VLAN tag of the trapped data packet with a port identifier identifying the first port, and wherein the table managing logic is configured to disable, in response to the metadata, MAC learning traps for the VLAN tag of the trapped data packet on the first port.

12. A switching element, comprising:

a plurality of ports, including at least a first port and a second port;

memory for storing a media access control (MAC) table and a virtual local area network (VLAN) table, the MAC table mapping MAC addresses to port identifiers identifying the ports and the VLAN table mapping VLAN tags to port identifiers identifying the ports;

a processor;

forwarding logic configured to receive a plurality of data packets from the ports, wherein for at least one of the data packets the forwarding logic is configured to search the MAC table for a mapping corresponding to a destination MAC address of the one data packet and to forward the one data packet to at least the second port based on the VLAN table in response to a MAC table miss for the destination MAC address, and wherein the forwarding logic is configured to trap one of the data packets received from the first port in response to a MAC table miss for a source MAC address of the trapped data packet such that metadata of the trapped data packet is transmitted to the processor; and table managing logic stored in the processor and configured to dynamically learn a plurality of VLAN tags based on the plurality of data packets and to build the VLAN table based on the learned VLAN tags, wherein the table managing logic for each of the learned VLAN tags is configured to update, in response to one of the data packets carrying the learned VLAN tag, the VLAN table to associate the learned VLAN tag with a port identifier identifying one of the ports that received the one data packet carrying the learned VLAN tag, wherein the table managing logic is configured to update the VLAN table based on the metadata such that the VLAN table associates a VLAN tag of the trapped data packet with a port identifier identifying the first port, and wherein the table managing logic is configured to disable, in response to the metadata, the switching element from updating the MAC table to learn the VLAN tag of the trapped data packet from data packets received by the first port.

* * * * *